Oct. 31, 1950 T. R. HARRISON 2,528,054
ANTIHUNT ELECTRICAL SERVOMOTOR APPARATUS
Filed March 25, 1944 4 Sheets-Sheet 1

*INVENTOR.*
THOMAS R. HARRISON

BY
*C. B. Spangenberg*
ATTORNEY.

Oct. 31, 1950     T. R. HARRISON     2,528,054
ANTIHUNT ELECTRICAL SERVOMOTOR APPARATUS

Filed March 25, 1944     4 Sheets-Sheet 2

*INVENTOR.*
THOMAS R. HARRISON

BY
*E. B. Spangenberg*
ATTORNEY.

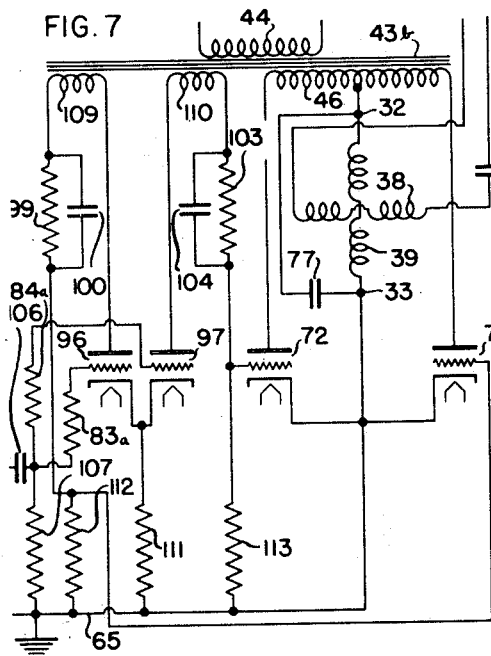
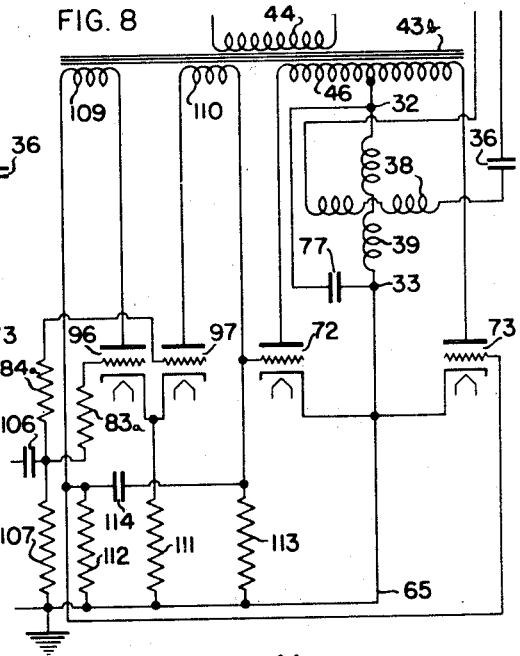
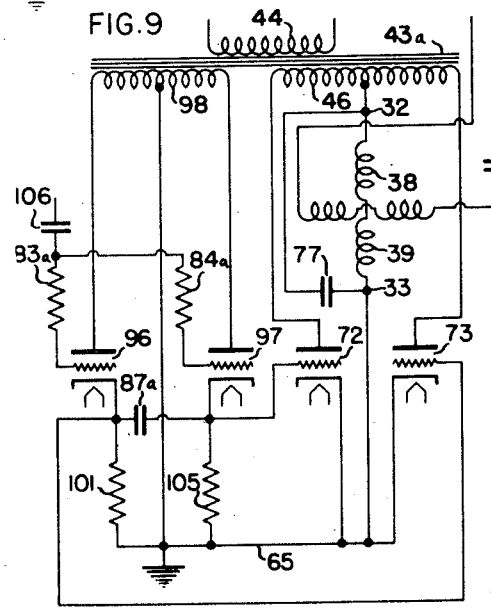
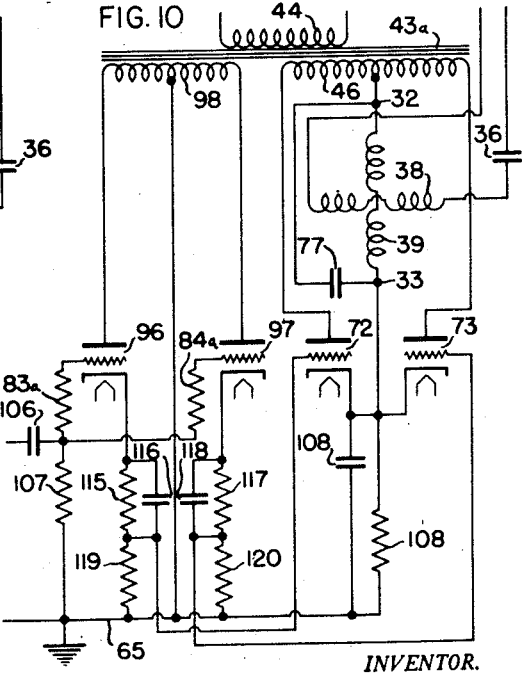

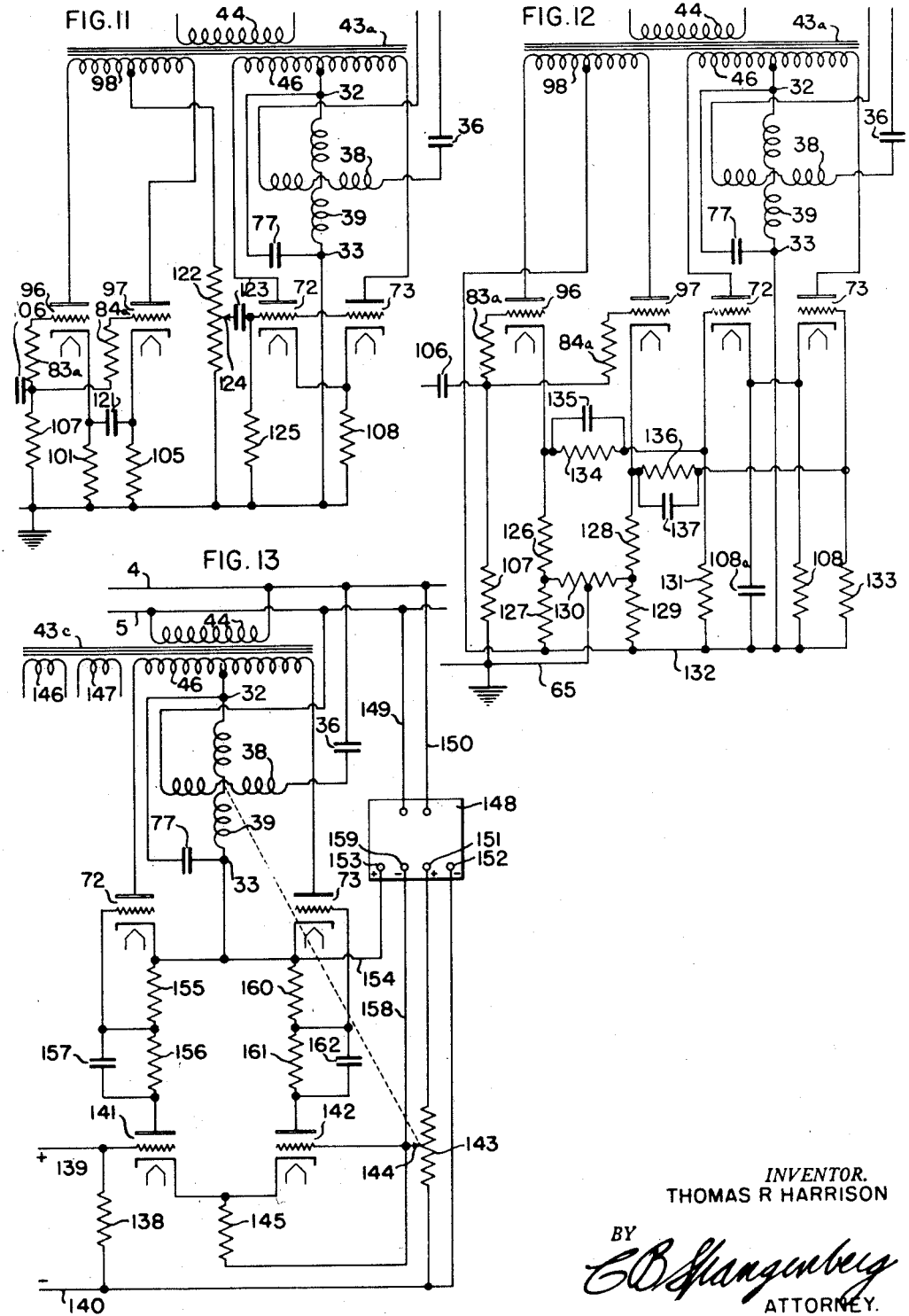

Patented Oct. 31, 1950

2,528,054

UNITED STATES PATENT OFFICE 2,528,054

ANTIHUNT ELECTRICAL SERVOMOTOR APPARATUS

Thomas R. Harrison, Wyncote, Pa., assignor, by mesne assignments, to Minneapolis-Honeywell Regulator Company, Minneapolis, Minn., a corporation of Delaware Application March 25, 1944, Serial No. 528,088

17 Claims. (Cl. 318—29)

The present invention relates to automatic exhibiting and/or controlling systems, and particularly, to the elimination of the hunting tendency of such systems.

A general object of the present invention is to provide self-balancing exhibiting and/or controlling apparatus including novel and effective means for introducing an anticipating control action into the apparatus rebalancing operations so as to eliminate or at least substantially minimize the hunting tendency which inevitably results from failure to terminate the rebalancing operations promptly enough to compensate for the inertia of the moving components of the apparatus.

The present invention is of particular utility in self-balancing electrical networks of the potentiometric or Wheatstone bridge type in which rebalancing operations are rapidly effected as required by means including a reversible rotatable rebalancing motor. Such a motor has a tendency to "coast" or continue its rotation after being deenergized.

In accordance with the present invention, upon change in the magnitude of a measured or other controlling condition, a normally balanced electrical network becomes unbalanced and sets into operation a driving system for effectuating a rebalancing adjustment of the network. Before completion of the rebalancing operation an additional electrical effect is created which causes premature deenergization of the driving system, and if desired, energization of the driving system for operation in the reverse direction. This additional electrical effect is correlated to the unbalance of the network in such manner that the driving system operates to rebalance the network in a minimum of time without the occurrence of overshooting of the balanced point of the network and consequent hunting.

Such anti-hunting provisions are desirable in self-balancing electrical networks inasmuch as the inertia of the various mechanically connected parts tends to so operate as to carry the driving system and its associated network rebalancing means beyond the true position of balance. When such over-shooting occurs, the network then becomes unbalanced in the opposite direction and initiates operation of the driving system in the reverse direction in an attempt to obtain rebalance, but again the necessary regulation is exceeded to thereby set up a continuous hunting about the balanced point.

The need for anti-hunting provisions in exhibiting and controlling apparatus of the self-balancing type has long been recognized and various methods and structures have been proposed heretofore for supplying this need. For example, it has preprosed to eliminate the hunting tendency by reducing the sensitivity of response of the system to unbalance thereof, but such a solution is generally unsatisfactory because of the attendant reduction in the available power to pull the system into its exact condition of balance. One prior art method for eliminating the hunting tendency in such apparatus is disclosed in Patent 1,827,520, issued to me on October 13, 1931, for Recording and Control System and Apparatus Therefor, and reissued as Re. 21,309, in which the speed of rebalance of an electrical network is proportional to the extent of network unbalance and mechanically movable means are provided to anticipate the true position of balance. Other prior art structures have provided means operative in response to the mechanical motion of the driving system for creating an electromotive force which is proportional to the speed of the driving system and which is opposed to the network unbalance to produce a condition of simulated rebalance of the network or a simulated condition of reverse unbalance before the network is actually rebalanced to thereby prematurely deenergize or to reverse the direction of energization of the driving system. As a result, the driving system is slowed down before the balanced position is reached and then gradually eases into the balanced position without exceeding it.

A specific object of the present invention is to provide improved anti-hunting means for use in self-balancing exhibiting and controlling apparatus in which an effect is created in a simple and efficient manner by solely electrical means without reducing the sensitivity of response of the system to unbalance thereof and without involving the use of any physically movable parts whatever for terminating the rebalancing operation sufficiently prior to the attainment of rebalance as required to compensate for the inertia of the driving system and associated rebalancing structure.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Figs. 3 through 12 are fragmentary diagrams illustrating modifications of the arrangement of Fig. 1; and Fig. 13 illustrates another type of self-balancing electrical network in which the advantageous features of the present invention may be incorporated.

Figure 1:
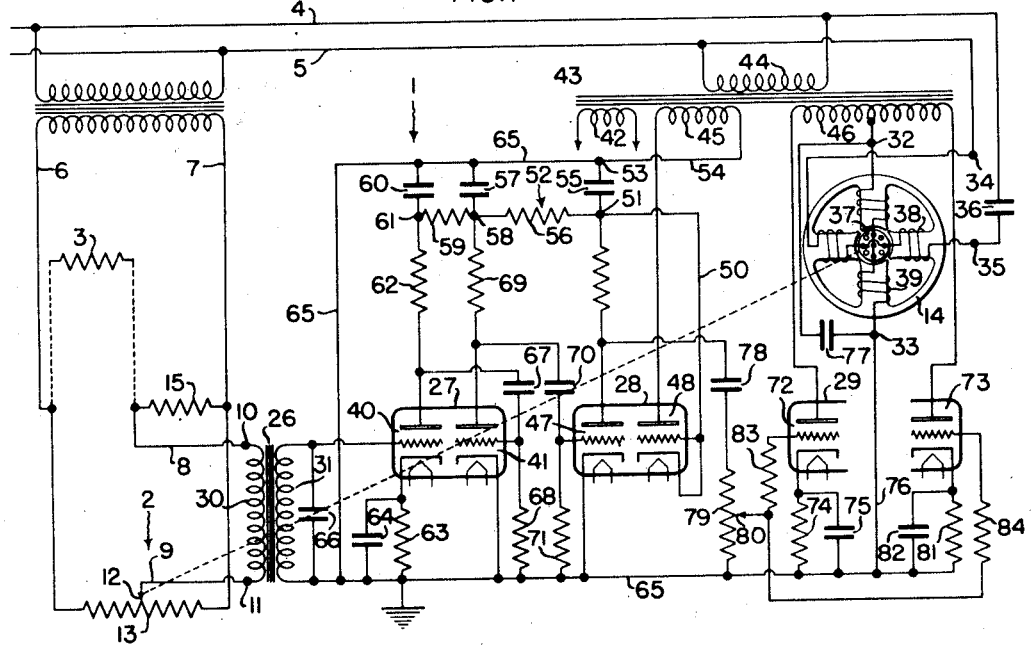
Fig. 1 is a diagrammatic illustration of a self-balancing Wheatstone bridge network utilizing the invention.

In Fig. 1 of the drawings an arrangement including an electronic motor drive system designated generally by the numeral 1 and described in detail hereinafter is illustrated for producing effects in accordance with the direction and extent of unbalance of a Wheatstone bridge network 2 which controls the operation of the electronic motor drive system 1 and is unbalanced in accordance with the variations in a quantity to be measured and/or controlled. Because of the small magnitude of the unbalanced electromotive forces produced at the output terminals of the bridge network 2, it is not practicable, nor desirable, to have the said electromotive forces directly perform a measuring or controlling operation.

More specifically, an arrangement is illustrated in Fig. 1 for measuring and recording the temperature of a region in which a resistance thermometer bulb 3 is located. Bulb 3 comprises a coil of wire having a substantial temperature coefficient of resistance and is connected in one arm of bridge network 2. On change in the temperature to which bulb 3 is subjected, the bridge network 1 becomes unbalanced in one direction or the other and to an extent depending upon the direction and magnitude, respectively, of the temperature change.

Energizing current of suitable frequency is supplied the bridge network 2 from a source of alternating current through supply mains 4 and 5. To this end one pair of bridge conjugate points is connected by conductors 6 and 7 and a transformer to the supply mains 4 and 5. The other pair of bridge conjugate points constitutes the bridge output terminals and is connected by conductors 8 and 9 to the input terminals 10 and 11 of the electronic motor drive system 1. One of the last mentioned bridge conjugate points is the point of engagement of a sliding contact 12 with a slidewire resistance 13. The sliding contact 12 is adjusted along the slidewire resistance 13 in accordance with the variations in the temperature to which the bulb 3 is responsive by a structure shown by a dotted line in Fig. 1 but illustrated in detail in Fig. 2 and including a reversible electrical motor 14 which is selectively energized for rotation in one direction or the other by the electronic motor drive system 1. The remaining arm of the bridge network is comprised of a resistance 15.

Upon variation in the temperature of the region to which the bulb 3 is exposed, the consequent change in resistance of the latter unbalances the bridge network 2 and as a result an unbalanced electromotive force will appear at the output terminals of the bridge network 2. This unbalanced electromotive force, the phase and amplitude of which is determined by the direction and extent of change of the temperature being measured, is impressed by conductors 8 and 9 on the input terminals of the electronic motor drive system 1 for selectively controlling the energization of the reversible motor 14 for rotation in one direction or the other, and hence, movement of the sliding contact 12 in the proper direction to reduce the bridge unbalanced electromotive force.

Figure 2:
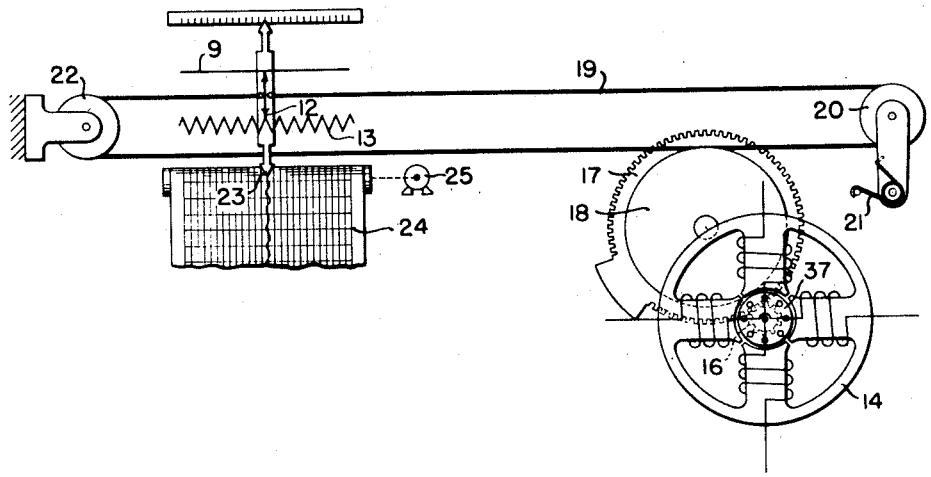
Fig. 2 illustrates the mechanical details of the driving system and associated rebalancing structure of the arrangement of Fig. 1.

As is shown in Fig. 2, the shaft of motor 14 drives a pinion 16 which is disposed in engagement with a gear 17. Attached to and movable with the gear 17 is a pulley 18 around which is wrapped an endless cable 19. The cable 19 is connected to the sliding contact 12 so that when the motor rotates the contact 12 will be moved in one direction or the other to rebalance the bridge network 2. One end of the cable 19 runs over a pulley 20 which is pivotally mounted and biased by a spring 21 to take up the slack in the cable. The other end of the cable 19 runs around a stationary pulley 22.

A pen 23 is mounted on the carriage which carries the bridge rebalancing sliding contact 12 and is arranged in cooperative relation with a recorder chart 24 to thereby provide a continuous record of the adjustments of the sliding contact 12 which are required to keep the bridge network balanced, and hence, to provide a record of the variations in magnitude of the temperature to which the bulb 3 is subjected. The chart 24 is a strip chart and is arranged to be driven in any convenient manner, as for example, by a unidirectional motor 25 through suitable gearing, not shown, so that a record of the variations in the unknown temperature will be recorded as a continuous line on chart 24.

The electronic motor drive system 1 is connected to and receives energizing current from the alternating current supply mains 4 and 5 through connections described hereinafter and includes an input transformer 26, a pair of preamplifier vacuum tubes 27 and 28 and a motor drive vacuum tube 29. Each of the vacuum tubes 27, 28 and 29 contain two triodes within the same envelope or bottle. The pre-amplifier tubes 27 and 28 provide three stages of preamplification. It will be understood as the description proceeds, however, that more or fewer stages of pre-amplification may be employed as is desired.

Transformer 26 is provided with a primary winding 30 and a secondary winding 31. The input terminal 10 of the electronic motor drive system is connected to one end of primary winding 31 and the input terminal 11 is connected to the other end thereof. Hence, the unbalanced alternating electromotive forces which are created at the output terminals of bridge network 2 upon change in the magnitude of resistance 3 are impressed on the transformer primary winding 30 and induce corresponding electromotive forces in the secondary winding 31. The electromotive forces so created in secondary winding 31 are amplified by means to be described and including the pre-amplifier vacuum tubes 27 and 28 and the amplified quantity is utilized to control the operation of the motor drive tube 29 as required to effect selective energization of motor 14 for rotation in one direction or the other according to the phase of the said induced electromotive forces. To this end the motor 14 is provided with a pair of terminals 32 and 33 which are connected in the output circuits of the two triodes contained in vacuum tube 29, and a pair of terminals 34 and 35 which are connected to the alternating current supply mains 4 and 5 through a condenser 36.

Motor 14 is a two phase rotating field motor and comprises a rotor 37 and two pairs of oppositely disposed field poles on one pair of which a winding 38 is wound and on the other pair of which a winding 39 is wound. Winding 38 has its terminals connected to the motor terminals 34 and 35 and is supplied with energizing current from the alternating current supply mains 4 and 5 through the condenser 36. Because of the inclusion of condenser 36 in the energizing circuit of winding 38, the current flow through this winding will be in phase with the voltage of the alternating current supply mains 4 and 5. The winding 39 has its terminals connected to the motor terminals 32 and 33 and is supplied with energizing current from the output circuits of the two triodes of the vacuum tube 29. The current supplied to the winding 39 from the vacuum tube 29 either leads or lags by approximately 90° the voltage of the alternating current supply mains and establishes a field in the motor rotor 37 which is displaced 90° in one direction or the other with respect to that established therein by the winding 38. The reaction between the field set up by the winding 39 with that set up with the winding 38 establishes a rotating field in the rotor which rotates in one direction or the other depending upon whether the winding 39 is energized with current which leads or lags the voltage supplied by the supply mains 4 and 5, and consequently in accordance with the direction of unbalance of the bridge network 2. The direction and duration of rotation of the motor 14 is controlled in accordance with the direction and extent of unbalance of the bridge network 2 so that on rotation of the motor 14 the sliding contact 12 is adjusted in the proper direction to rebalance the bridge network 2.

The amplifying tube 27 of the electronic motor drive system 1 includes two heater type triodes designated by the reference characters 40 and 41 within the same envelope. The triodes 40 and 41 each include anode, control electrode, cathode, and heater filament elements. The heater filaments are connected in parallel and are supplied with energizing current from the secondary winding 42 of a transformer 43 having a line voltage primary winding 44 and additional windings 45 and 46. In order not to complicate the drawing the conductors connecting the transformer secondary winding 42 to the heater filaments of triodes 40 and 41 have not been shown. The transformer secondary winding 42 is also connected, by conductors not shown, to the heater filaments of the triodes contained within the amplifying tube 28 and the motor drive tube 29.

The electronic tube 28 also includes two heater type triodes designated by reference numerals 47 and 48 within the same envelope. Each of the triodes 47 and 48 include anode, control electrode, cathode, and heater filament elements. The heater filaments of triodes 47 and 48 are also connected in parallel. The triode 48 is utilized as a half wave rectifier to provide a source of unidirectional voltage for energizing the anode or output circuits of the triodes 40, 41 and 47. To this end, the control electrode and cathode of the triode 48 are directly connected to each other, and the output circuit thereof is energized by the transformer secondary winding 45 through a circuit which may be traced from the left end terminal of the winding 45 through a conductor 49 to the anode of triode 48, the cathode thereof, and through a conductor 50 to the positive terminal 51 of a filter generally designated by the reference character 52. The negative terminal 53 of the filter is connected by a conductor 54 to the right end terminal of the transformer secondary winding 45 and is also connected to ground potential through a conductor 65.

The filter 52 includes a condenser 55 which operates to smooth out the ripple in the output voltage of the filter between the points 51 and 53 and also includes a resistance 56 and a condenser 57 which operate to smooth out the voltage between the filter points 58 and 53. A further resistance 59 and a condenser 60 are provided in the filter 52 to smooth out the voltage between the filter points 61 and 53. Thus, the filter comprises three stages. A three-stage filter is provided because in order to obtain the most satisfactory and efficient operation it is desirable that the voltage applied to the output circuit of triode 40 be substantially free from ripple whereas it is not necessary to supply anode voltage so completely free from ripple to the output circuit of the triode 41. Likewise, it is not necessary to supply anode voltage so free from ripple to the output circuit of triode 47 as it is to triode 41.

The anode or output circuit of the triode 40 may be traced from the filter point 61 comprising the positive terminal of the unidirectional voltage supply through a fixed resistance 62 to the anode of triode 40, the cathode, and through a cathode biasing resistance 63 shunted by a condenser 64 to the negative filter point 53 through the grounded conductor 65. The cathode biasing resistance 63 and condenser 64 are provided for biasing the control electrode of triode 40 negatively with respect to the cathode.

The input circuit of the triode 40 may be traced from the cathode through the parallel connected resistance 63 and condenser 64 and through the transformer secondary winding 31 to the control electrode. A tuning condenser 66 may desirably be connected in shunt to the transformer secondary winding 31 as shown.

The output circuit of triode 40 is resistance-capacitance coupled to the input circuit of triode 41 by means of a condenser 67 and a resistance 68. Specifically, the anode of triode 40 is connected by condenser 67 to the control electrode of triode 41 and the control electrode of triode 41 is connected through the resistance 68 to the grounded conductor 65. The cathode of triode 41 is directly connected to the grounded conductor 65. The resistance 68 in addition to its coupling function serves to limit the extent to which the control electrode of triode 41 may go positive with respect to its associated cathode and also maintains the control electrode of triode 41 at the same potential as its associated cathode when no voltage is produced in the transformer secondary winding 31.

The anode or output circuit of the triode 41 may be traced from the positive terminal 58 of the filter 52 through a fixed resistance 69 to the anode of triode 41, the cathode, and the grounded conductor 65 to the negative terminal 53 of the filter.

The output circuit of triode 41 is resistance-capacitance coupled to the input circuit of the triode 47 by means of a condenser 70 which is connected between the anode of triode 41 and the control electrode of the triode 47 and by means of a resistance 71 which is connected between the control electrode of triode 47 and the cathode thereof. The resistance 71 serves to limit the extent to which the control electrode of the triode 47 may be driven positive with respect to its associated cathode and also to maintain the said control electrode at the same potential as the cathode when no voltage is produced in the transformer secondary winding 31.

The electronic tube 29 includes two heater type triodes 72 and 73 within the same envelope. Anode voltage is supplied the output circuit of the triode 72 from the transformer secondary winding 46 through a circuit which may be traced from the left end terminal of the secondary winding 46 to the anode of triode 72, the cathode thereof, a cathode biasing resistance 74 shunted by a condenser 75, a conductor 76 and motor winding 39 to the center tap on the transformer secondary winding 46. A condenser 77 of value suitable for tuning the motor winding 39 is connected in parallel to the latter.

Anode voltage is supplied the triode 73 through a circuit which may be traced from the right end terminal of the transformer secondary winding 46 to the anode of triode 73, the cathode, a cathode biasing resistance 81 shunted by a condenser 82, conductor 76 and motor winding 39 to the center tap on winding 46.

The cathode biasing resistances 74 and 81 and associated condensers 75 and 82 operate in a manner explained in detail hereinafter to effect premature deenergization of the motor 14 for rotation when the bridge network 2 is being rebalanced following unbalancing thereof to anticipate the approach of the rebalancing contact 12 to the true balanced position in order that the speed of the reversible motor 14 may be as great as possible during the rebalancing operation of the bridge network 2 without overshooting of the balance point and consequent hunting occurring. Preferably, the time constant of the parallel connected resistance 74 and condenser 75 is the same as that of the resistance 81 and condenser 82. To this end the resistances 74 and 81 may desirably be of the same value and so may the condensers 75 and 82.

The output circuit of the triode 47 is resistance-capacity coupled to the input circuits of the triodes 72 and 73 by means of a condenser 78 and a resistance 79. In particular, the anode of the triode 47 is connected through the condenser 78 and a current limiting resistance 83 to the control electrode of the triode 72 and through the condenser 78 and a current limiting resistance 84 to the control electrode of triode 73. Both of the said control electrodes are connected through their respective current limiting resistances 83 and 84 and the resistance 79 to the grounded conductor 65. A contact 80 in adjustable engagement with the resistance 79 is provided for varying the point of connection of the control electrodes of triodes 72 and 73 to the resistance 79. The resistance 79 and contact 80 perform a dual function, namely, to maintain the control electrodes of the triodes 72 and 73 at the same potential as the grounded conductor 65 when no voltage is induced in the transformer secondary winding 31, and upon the induction of a voltage in the winding 31 to permit the flow of grid current to thereby limit the extent to which the control electrodes of the triodes 72 and 73 may go positive with respect to their associated cathodes.

The motor 14 is preferably so constructed that the impedance of the winding 39, when connected across the condenser 77, is the proper value to match the impedance of the anode circuits of the triodes 72 and 73 when the motor is operating, in order to obtain the most efficient operation. Preferably, the motor is so constructed that it has a high ratio of inductive reactance to resistance, for example, of the order of 6 to 1 or from 8 to 1 at the frequency of the energizing alternating current supplied to it. This provides for efficient action and power during the running condition of the motor with the least amount of heating and also provides a low impedance path which provides a desirable braking action.

The condenser 36 connected in the energizing circuit to the motor winding 38 is so selected with respect to the inductance of the latter as to provide a series resonant circuit having a unity power factor. By virtue of the series resonant circuit, the total impedance of the motor winding 38 is substantially equal to the resistance of the winding, and since this resistance is relatively low a large current flow through the motor winding 38 is made possible. This permits the attainment of maximum power and torque from the motor 14. In addition, the current flow through the motor winding 38 is in phase with the voltage of the alternating current supply mains 4 and 5 because of the series resonant circuit. The voltage across the motor winding 38, however, leads the current flow by substantially 90° because of the inductance of the winding 38.

Energizing current is supplied to the motor winding 39 from the transformer secondary winding 46 through the anode circuits of the triodes 72 and 73 through the circuits previously traced. The condenser 77 which is connected in shunt to the motor winding 39 is so chosen as to provide a parallel resonant circuit with the motor winding 39 having substantially unity power factor. This parallel resonant circuit presents a relatively high external impedance and a relatively low local circuit impedance. The relatively high external impedance is approximately the same as the impedance of the anode circuits of the triodes 72 and 73, and therefore, provides efficient operation. The relatively low internal circuit impedance approximates the actual resistance of the motor winding 38, and since this resistance is relatively low the impedance of the local circuit is also relatively low.

For the condition when the bridge network 2 is balanced, no voltage is induced in the transformer secondary winding 31, and hence, the potentials of the control electrodes of all of the triodes 40, 41, 47, 72 and 73 remain substantially constant. Under this condition of operation a pulse of unidirectional current flows through the anode circuits of the triode 72 to the motor winding 39 from the left hand section of the transformer secondary winding 46 during the first half cycle of the alternating voltage supply. During the second half cycle of the alternating voltage supply a pulse of unidirectional current flows through the anode circuit of the triode 73 to the motor winding 39 from the right hand section of the transformer secondary winding 46. Since the control electrodes of the triodes 72 and 73 are connected together, and inasmuch as the potentials of these control electrodes remain substantially constant when the bridge network 2 is balanced, pulses of equal magnitude flow in the anode circuits of the triodes 72 and 73 during alternate half cycles of the alternating voltage supplied by the transformer secondary winding 46.

Consequently, when the bridge network 2 is balanced, pulsating unidirectional current of twice the frequency of the alternating supply current is impressed on the motor winding 39. When thus energized, the motor rotor 37 is not urged to rotation in either direction and remains stationary. Due to the relatively high direct current component of the current then flowing through the motor winding 39 a damping effect is exerted on the rotor 37 of the motor or in other words an effect tending to retard rotation of the rotor 37. By virtue of this damping effect, if the rotor 37 had been rotating currents are induced in the conductors of the rotor dissipating the rotor's energy and thereby stopping its rotation.

Upon unbalance of the bridge network 2, the magnitude of the pulses of current flowing in the anode circuit of the triode 72 will be increased while the magnitude of the pulses of current flowing in the anode circuit of the triode 73 will be decreased. Consequently, the pulses of unidirectional current supplied to the motor winding 39 during the first half cycle will predominate over those supplied the motor winding 39 during the second half cycle. Such energization of the motor winding 39 operates to introduce therein an alternating component of current of the same frequency as that supplied by the alternating current supply mains 4 and 5. This alternating component of current will be either 90° out of phase or 270° out of phase with the alternating current flowing through motor winding 38 depending upon the direction of bridge network unbalance and produces an alternating magnetic field in the motor core structure which reacts with the alternating magnetic field established by the motor winding 38 to produce a rotating field in the rotor 37. This rotating field rotates in one direction or the other depending upon the direction of bridge network unbalance and actuates the rotor 37 for rotation in a corresponding direction. When the motor winding 39 is so energized, the direct current component of current is decreased with the result that the rotor damping effect is also reduced.

In order to obtain rapid operation of the reversible electrical motor 14 in effectuating rebalance of the bridge network 2 without overshooting and consequent hunting taking place, the response of the motor 14 is correlated with the unbalancing and the rebalancing operations of the bridge network. This is accomplished by adjusting the contact 80 along the resistance 79 which is employed for the purpose of coupling the output circuit of the triode 47 to the input circuits of the triodes 72 and 73. By moving the contact 80 in an upward direction the amplitude of signal on the control electrodes of triodes 72 and 73 is increased for any given signal produced in the transformer secondary winding 31, and by moving the contact 80 in a downward direction, the amplitude of signal is decreased. This, therefore, adjusts the sensitivity of the electronic motor drive system 1 whereby the response of the reversible electrical motor 14 may be correlated exactly with the operation of the bridge network 2. It will be apparent that, if desired, this sensitivity adjustment may be provided between two of the pre-amplifier stages instead of between the pre-amplifier and motor drive tubes. For example, the point of connection of the control electrodes of triode 47 to the resistance 71 may be made adjustable to provide such a sensitivity adjustment.

In some applications of the self-balancing Wheatstone bridge network disclosed in Fig. 1, the damping action obtained as a result of the direct current component of current through the motor winding 39 is sufficient to prevent overshooting and consequent hunting occurring. There are many other applications, however, wherein it is desired to effectuate the rebalancing operations of the bridge network 2 at a higher rate of speed while maintaining a high degree of sensitivity and large driving torque even with a small driving signal impressed on the input circuit of the electronic system 1, and in such applications the damping action obtained by means of the direct current component through the motor winding 39 is insufficient to prevent coasting and consequent hunting occurring. In order that the speed of the reversible motor 14 may be increased so as to fulfill the conditions of such high speed applications without overshooting and consequent hunting occurring, the cathode biasing resistances 74 and 81 and their respectively associated condensers 75 and 82 have been provided in accordance with the present invention to cause premature de-energization of the motor 14 for rotation when the bridge network is being rebalanced as is required to compensate for the inertia of the motor rotating elements and the associated rebalancing means. The manner in which the resistances 74 and 81 and condensers 75 and 82 operate to accomplish this result will now be explained.

As has been previously noted, unbalance of the bridge network 2 produces an alternating electromotive force of supply line frequency which is amplified by the pre-amplifier tubes 40, 41 and 47 and is impressed on the control electrodes of both motor drive tubes 72 and 73. On the assumption that the direction of bridge network unbalance is such that the alternating voltage impressed on the control electrodes of tubes 72 and 73 drives the said control electrodes in the positive or less negative direction during the half cycle of the supply line voltage that the anode of tube 72 is positive and the anode of the tube 73 is negative, and drives the control electrodes in the negative direction during the half cycle that the anode of tube 73 is positive, the conductivity of tube 72 will be increased by the bridge network unbalance while the conductance of tube 73 will be decreased. This difference in the conductivities of the two motor drive tubes operates to cause selective energization of the reversible motor 14 for rotation in the proper direction to effectuate rebalance of the bridge network 2.

When the alternating voltage impressed on the control electrodes of tubes 72 and 73 is sustained, there is a decrease in the conductance of tube 72 which is produced as the condenser 75 gradually charges to the new increased voltage drop across the biasing resistance 74 which is produced as a result of the increased conductance of tube 72. Simultaneously, there is an increase in the conductance of tube 73 which is produced as the condenser 82 gradually discharges to the new decreased voltage drop across the biasing resistance 81 which is caused by the decreased conductance of tube 73. Stated differently, with sustained unbalance of the bridge network in one direction, there is an increase in the negative bias which is impressed on the control electrode of tube 72 and a decrease in the negative bias which is impressed on the control electrode of tube 73. With such bias voltages temporarily maintained on the input circuits of tubes 72 and 73 by virtue of the action of condensers 75 and 82, reduction in the degree of bridge network unbalance will abnormally decrease the conductivity of tube 72 and simultaneously increase that of tube 73. Due to this action equality in the conductivities of the two tubes 72 and 73 will be restored before the bridge network is completely rebalanced, and the conductive conditions of the tubes may even be reversed before the bridge network is rebalanced when the alternating voltage impressed on the input circuits of tubes 72 and 73 decreases at a suitably rapid rate in relation to the instantaneous magnitude of that voltage. Consequently, before the bridge network 2 has been rebalanced the energization of motor 14 for rotation in the rebalancing direction will have been reduced to zero and may even be reversed. This sequence of events brought about by the inclusion of the cathode biasing resistances 74 and 81 and condensers 75 and 82 in the motor drive stage of the electronic motor drive system 1 produces a positive and powerful braking action which will quickly check the motor speed before the new balanced position of the rebalancing contact 12 along the slidewire resistance 13 is reached, and which will gradually reduce the motor speed to zero as the bridge network unbalance is reduced to zero. In this manner, the speed of operation of the reversible electrical motor 14 in effecting rebalance of the bridge network 2 may be made exceedingly great without overshooting and consequent hunting taking place.

Upon sustained unbalance of the bridge network in the opposite direction, the conditions are reversed, that is, there is a decrease in the negative bias which is impressed on the control electrode of tube 72 and an increase in the negative bias which is impressed on the control electrode of tube 73 with the resulting retarding effect on the motor rotation as the bridge network balanced point is approached.

In Figs. 3 through 12, I have illustrated, more or less diagrammatically, fragmentary diagrams of advantageous modifications of the motor drive stage disclosed in Fig. 1 and including tubes 72 and 73.

Figure 3:
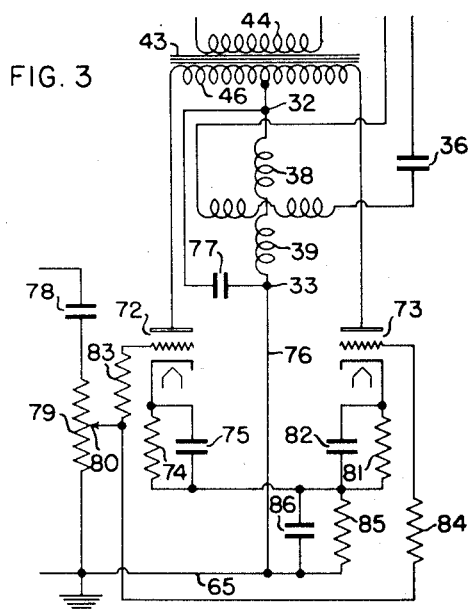

The arrangement of Fig. 3 is generally like that of Fig. 1 but differs therefrom in that it includes a cathode biasing resistance 85 and parallel connected condenser 86 which are common to both of the input circuits of the motor drive tubes 72 and 73. Specifically, the resistance 85 and condenser 86 are connected between the negative terminals of the damping components 74, 75, 81 and 82 and the grounded conductor 65. Hence, the resistance 85 and condenser 86 constitute a mutual biasing means for the tubes 72 and 73 for effecting operation of the latter over an optimum portion of their grid voltage-plate current characteristic curves.

Figure 4:
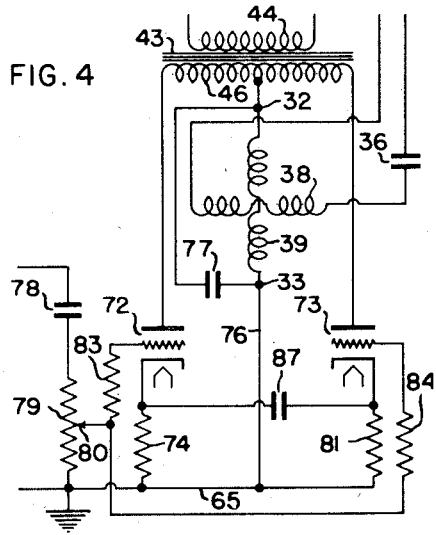

In the modification of Fig. 4 a single time delay or damping condenser 87 is employed in place of the two time delay or damping condensers 75 and 82 of Fig. 1. Condenser 87 is connected directly between the cathodes of tubes 72 and 73 and operates, in conjunction with resistances 74 and 81, upon sustained unbalance of the bridge network 2, to effectuate a delayed decrease in the conductance of the tube 72 or 73, the conductance of which was increased as a result of the bridge unbalance, and a delayed increase in the conductance of the other tube. As the rebalancing action of the reversible motor 14 and the associated rebalancing mechanism reduces the unbalance of bridge network 2, delayed recovery in the biasing potentials across resistances 74 and 81 is caused by the condenser 87 to effect premature restoration of the tube conductances to equality or even a reversal in the conductive conditions, thus producing a positive and powerful damping action.

Figure 5:
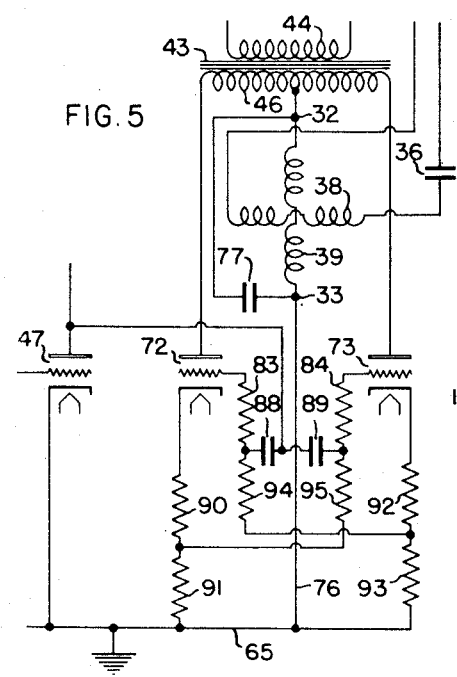

In the modification of Fig. 5 separate coupling condensers 88 and 89 are employed between the output circuit of the pre-amplifier tube 47 and each of the input circuits of the motor drive tubes 72 and 73 in place of the single coupling condenser 78 of Fig. 1. The coupling condensers 88 and 89 are so arranged and utilized that they also serve to accomplish the desired time delay or damping action provided by the condensers 75 and 82 of Fig. 1. Hence, there is no need for the condensers 75 and 82 in Fig. 5.

Specifically, the anode of pre-amplifier tube 47 is connected to the common terminal of condensers 88 and 89. The other terminal of condenser 88 is connected through a current limiting resistance 83 to the control electrode of tube 72 and the other terminal of condenser 89 is connected through a current limiting resistance 84 to the control electrode of tube 73. A pair of series connected cathode biasing resistances 90 and 91 are provided in the cathode circuit of tube 72 between the cathode and the grounded conductor 65, and a pair of similar series connected cathode biasing resistances 92 and 93 are provided in the cathode circuit of tube 73 between the cathode and conductor 65. A resistance 94 is connected between the control electrode of tube 72 and the point of engagement of resistances 92 and 93 in the cathode circuit of tube 73, and a resistance 95 is connected between the control electrode of tube 73 and the point of engagement of the resistances 90 and 91 in the cathode circuit of tube 72. Resistances 94 and 95 serve in conjunction with their respectively associated resistances 93 and 91 to limit the extent to which the control electrodes of the tubes 72 and 73 may be driven positive with respect to their associated cathodes and also to maintain the said control electrodes at the same potential as the cathode when the bridge network 2 is balanced. Thus, in this modification, the resistances 94 and 95 in conjunction with the resistances 91 and 93 serve to replace the resistance 79 of Fig. 1, and accordingly, the desired sensitivity adjustment may be obtained by providing a variable coupling between stages of the pre-amplifier as previously explained.

In the arrangement of Fig. 5 the resistances 94 and 95 may be made very high in value in comparison to the highest permissible value of resistance 79 in Fig. 1, and therefore, the same time delay or anti-hunting effect may be obtained with condensers 88 and 89 of small value compared to the value of condensers 75 and 82 of Fig. 1.

Each of the modifications of Figs. 6 through 12 is provided with a separate pair of triodes 96 and 97 between the output circuit of the pre-amplifier triode 47 and the input circuits of the motor drive tubes 72 and 73 and include resistance-capacitance means in the anode circuits for producing premature deenergization of motor 14 or even reversal in the energization thereof during the bridge rebalancing operations as required to compensate for the inertia of the motor and associated rebalancing mechanism.

Figure 6:
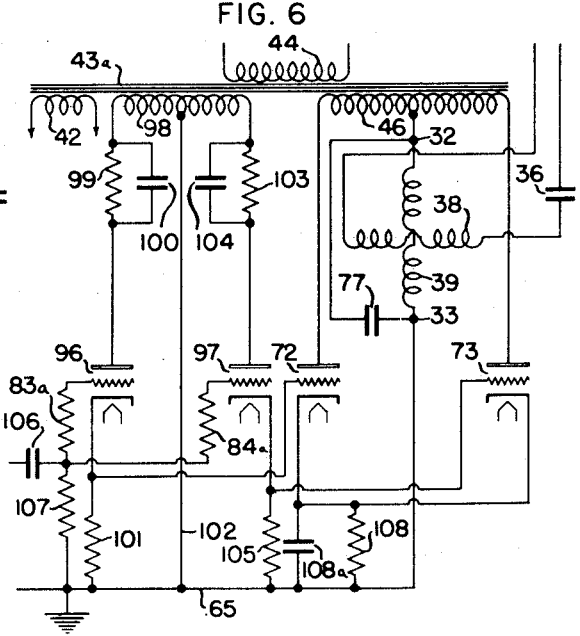

Referring to Fig. 6 it will be noted that the triodes 96 and 97 are of the indirectly heated type having heater filaments which conveniently may be supplied with energizing current from the transformer secondary winding 42 of a transformer 43a which corresponds generally to the transformer 43 of Fig. 1 but includes an additional center tapped secondary winding 98 which is provided to supply energizing voltage to the anode circuits of triodes 96 and 97. The anode circuit of triode 96 may be traced from the left end terminal of winding 98 through a parallel connected resistance 99 and condenser 100 to the anode of triode 96, the cathode thereof, a cathode biasing resistance 101, and a conductor 102 to the center tap on winding 98. The anode circuit of triode 97 may be traced from the right end terminal through a parallel connected resistance 103 and a condenser 104 to the anode of triode 97, the cathode, a cathode biasing resistance 105, and the conductor 102 to the center tap on winding 98.

The output circuit of the pre-amplifier output triode 47 is coupled to the input circuits of triodes 96 and 97, which input circuits are connected in parallel, by means of a condenser 106 and a resistance 107. To this end, the anode of triode 47 is connected through the condenser 106 to each of the control electrodes of triodes 96 and 97, and the said control electrodes are connected through the resistance 107 to the grounded conductor 65. Desirably, a current limiting resistance 83a may be connected between the control electrode of triode 96 and the condenser 106, and a current limiting resistance 84a may be connected between the control electrode of triode 97 and condenser 106. The point of connection of the control electrodes of tubes 96 and 97 to the resistance 107 may be made adjustable, if desired, for obtaining a sensitivity adjustment, or such adjustment can be provided between stages in the pre-amplifier as previously explained.

In Fig. 6 the cathodes of the motor drive tubes 72 and 73 are directly connected to each other and through a common cathode biasing resistance 108 and parallel connected condenser 108a to the grounded conductor 65. The control electrode of tube 72 is connected directly to the cathode of triode 96, and the control electrode of tube 73 is connected to the cathode of triode 97. Hence, the pulsating potential drop produced across the resistance 101 by the current flow through triode 96 is utilized to control the conductivity of tube 72 and the pulsating potential drop produced across the resistance 105 by the current flow through triode 97 is utilized to control the conductivity of tube 73. The pulsating potential drop across each of the resistances 101 and 105 is of the proper polarity to tend to drive the associated control electrodes of tubes 72 and 73 positive with respect to the potentials of the cathodes of said tubes.

It is noted that when tubes 72 and 73 are of the type which cut off when the control electrodes are at the same potential as the associated cathodes, resistance 108 and the parallel condenser 108a may be eliminated. For tubes requiring negative bias for cut off, the conduction of one tube 72 or 73 stores a potential across the condenser 108a which serves as bias to cut off the other tube.

The manner in which the parallel connected resistance 99 and condenser 100, and the parallel connected resistance 103 and condenser 104 in Fig. 6 operate to prematurely deenergize the motor 14 for rotation or to energize the motor for rotation in the reverse direction during the bridge rebalancing operations as required to compensate for the inertia of the motor and associated rebalancing mechanism will now be explained. On the assumption that the direction of bridge network unbalance is such that the alternating voltage impressed on the control electrodes of triodes 96 and 97 from the output stage of the pre-amplifier drives the said control electrodes less negative or even positive during the half cycle of the supply line voltage that the anode of triode 96 is positive and the anode of triode 97 is negative, the conductivity of triode 96 will be increased while that of triode 97 will be decreased. Consequently, the pulsating potential drop produced across resistance 101 by the current flow through triode 96 will exceed that produced across resistance 105 by the current flow from triode 97. This will cause the conductivity of tube 72 to exceed that of tube 73, and accordingly, selective energization of motor 14 for rotation in the proper direction to effect rebalance of the bridge network 2.

The increased conductivity of triode 96 will cause an increase in the potential drop across resistance 99 and condenser 100 in its anode circuit, and similarly, the decreased conductivity of triode 97 will cause a decrease in the potential drop across the resistance 103 and condenser 104. Because of the tendency of the condensers 100 and 104 to delay any change in potential drop across their terminals, the said changes in potential drop across resistances 99 and 103 are gradual and occur at a rate determined by the time constants of the parallel connections. The effect of such gradual increase in potential drop across resistance 99 is a gradual reduction in the anode voltage impressed on the triode 96 during the half cycles that the latter is conductive, and similarly, the effect of the gradual decrease in potential drop across resistance 103 is a gradual increase in the anode voltage impressed on the triode 97 during the conductive half cycle of the latter. This action effectively decreases the amplification provided by triode 96 and increases that of triode 97 with the result that before the bridge network 2 has been rebalanced the pulsating potential drop produced across resistance 105 is made equal to or greater than the potential drop across resistance 101. As a result, the motor 14 will be deenergized for rotation or energized for rotation in the reverse direction before bridge rebalance has been accomplished. By proper choice of the circuit components, this premature deenergization of motor 14 or reversal in energization may be accomplished as required to exactly compensate for the inertia of the motor and its associated rebalancing mechanism, thus effectively eliminating or at least minimizing overshooting and consequent hunting. As the motor speed gradually decreases, the potentials across the condensers 100 and 104 equalize so that when the motor has come to a stop and the unbalanced voltage has been reduced to zero, the motor is not energized for rotation in either direction and remains stationary.

The arrangement of Fig. 7 is generally like that of Fig. 6 but differs therefrom in respect to the manner of coupling the output circuits of the triodes 96 and 97 to the input circuits of tubes 72 and 73. In Fig. 7 the transformer 43b corresponds to the transformer 43a of Fig. 6 and differs therefrom in that two separate secondary windings 109 and 110 are provided in place of the winding 98. The anode circuit of triode 96 is energized by the winding 109 through a circuit which may be traced from the right end of winding 109 to the anode of triode 96, the cathode, a cathode biasing resistance 111, the grounded conductor 65, a resistance 112, and the parallel connected resistance 99 and condenser 100 to the left end terminal of winding 109. Similarly, the anode circuit of triode 97 may be traced from the left end terminal of winding 110 to the anode of triode 97, the cathode biasing resistance 111, grounded conductor 65, a resistance 113, and the parallel connected resistance 103 and condenser 104 to the right end terminal of winding 110.

The cathodes of the motor drive tubes in this modification are directly connected to each other and to the grounded conductor 65. The control electrode of tube 72 is connected to the upper terminal of resistance 113 and the control electrode of tube 73 is connected to the upper terminal of resistance 112. Accordingly, the potential drop produced across resistance 113 by the output current flow from tube 97 is utilized to control the conductivity of tube 72, and the potential drop produced across resistance 112 by the output current flow from tube 96 is utilized to control the conductivity of tube 73.

Upon unbalance of the bridge network 2, for example, when the direction of unbalance is such that the alternating voltage impressed on the control electrodes of triodes 96 and 97 from the output stage of the pre-amplifier drives the said control electrodes less negative or even positive during the half cycle of the supply line voltage that the anode of triode 96 is positive and the anode of triode 97 is negative, the conductivity of triode 96 will be increased while that of triode 97 will be decreased. The pulsating potential drop produced across resistance 112 will then exceed that across resistance 113, and hence, tube 73 will be rendered more conductive than tube 72 to effect energization of motor 14 for rotation.

The increased current flow through triode 96 will produce a gradual increase in the potential drop across resistance 99 and condenser 100, and hence, a gradual reduction in the anode voltage applied to triode 96. Conversely, the decreased current flow through triode 97 will cause a gradual decrease in the potential drop across resistance 103 and condenser 104 and a consequent gradual increase in the anode voltage applied to triode 97. This operation, similarly to that of Fig. 6, causes a decrease in the amplification provided by triode 96 and an increase in the amplification provided by triode 97. Consequently, before the bridge network 2 has been rebalanced the pulsating potential drop produced across resistance 113 is made equal to or greater than that across resistance 112 to effect premature deenergization of motor 14 for rotation or reversal in its energization as required to compensate for the inertia of the motor and the associated rebalancing mechanism.

Fig. 8 illustrates a modified arrangement of the Fig. 7 disclosure wherein the parallel connected resistance 99 and condenser 100 and the parallel connected resistance 103 and condenser 104 have been eliminated, and the premature deenergization and reversal in the energization of motor 14 are obtained by means of a condenser 114 connected between the upper terminals of resistances 112 and 113. With this arrangement, upon sustained unbalance of bridge network 2, delayed recovery in the biasing potentials produced across resistances 112 and 113 is caused by condenser 114 to effect premature deenergization or reversal in the energization of motor 14, as the alternating voltage impressed on the input circuits of triodes 96 and 97 from the preamplifier output stage decreases and thereby to prevent overshooting and consequent hunting of the bridge rebalancing contact 12 about the balancing point.

Fig. 9 illustrates a modification of the embodiment of my invention shown in Fig. 6 in which a single time delay or damping condenser 87a is employed in lieu of the parallel connected resistance 99 and condenser 100 in the anode circuit of triode 96 and the parallel connected resistance 103 and condenser 104 in the anode circuit of triode 97. Condenser 87a is connected directly between the cathode of tubes 96 and 97 and operates, in conjunction with resistances 101 and 105, upon sustained unbalance of the bridge network 2 to cause a delayed decrease in the conductance of the tube 72 or 73 whose conductivity was increased as a result of bridge unbalance and to cause a delayed increase in the conductance of the other tube. In this arrangement, as the rebalancing action of the reversible motor 14 and the associated rebalancing structure decreases the unbalance of the bridge network 2, delayed recovery in the biasing potentials across resistances 101 and 105 is caused by the condenser 87a to produce premature restoration of the conductances of tubes 72 and 73, or even reversal in those conductive relations, and thereby a positive and powerful damping action on the operation of motor 14.

It is noted that the tubes 72 and 73 in the arrangement of Fig. 9 may either be of the type which cut off when the potentials of the control electrodes are the same as their associated cathodes or may be of the type requiring a negative potential on the control electrodes relatively to the potentials of the associated cathodes to cut off their conduction. When the direction of bridge network unbalance is such as to cause the triode 96 to become more conductive than the triode 97, and hence, to cause the control electrode of tube 73 to be driven positive with respect to its associated cathode to cause energization of motor 14 for rotation in one direction, a charge is stored on condenser 87a during the half cycle that triode 96 is conductive which dissipates itself during the next half cycle through resistances 101 and 105. During this latter half cycle triode 97 tends to conduct but its conductivity is reduced by the alternating potential impressed on its control electrode as a result of the bridge network unbalance. The direction of the condenser discharge current through resistance 105 for the condition of unbalance under consideration, is such as to render the lower end of resistance 105 positive with respect to the potential of the upper terminal, and hence, to apply a negative potential to the control electrode of tube 72 which tends to cut off the conduction of this tube even though it is of the type requiring a negative potential on the control electrode to produce cut off.

The modification of Fig. 10 differs in arrangement from that of Fig. 6 in that a parallel connected resistance 115 and a condenser 116 are connected in the cathode circuit of triode 96 and a resistance 117 and condenser 118 are connected in the cathode circuit of triode 97 for obtaining the desired hunting elimination in the motor operation in place of the parallel connected resistance 98 and condenser 99 and the parallel connected resistance 103 and condenser 104. In addition, the cathode biasing resistance 101 of Fig. 6 has been eliminated in this modification, being replaced partially by the resistance 115 and partially by a resistance 119. Similarly, the cathode biasing resistance 105 has been replaced partially by the resistance 117 and a resistance 120. The control electrode of tube 72 is connected to the point of connection of resistances 115 and 119 while the control electrode of tube 73 is connected to the point of connection of resistances 117 and 120.

The provisions of the anti-hunting means 115, 116 and 117, 118 in the respective cathode circuits of triodes 96 and 97 operates to cause a change in one direction in the amplification of triode 96 upon sustained bridge unbalance by changing in a corresponding direction the bias voltage impressed on the control electrode of triode 96, and to simultaneously cause a change in the opposite direction in the amplification of triode 97 by correspondingly changing the bias voltage impressed on the control electrode of triode 97. Otherwise the operation of this modification of my invention is like that of Fig. 6, and therefore, further explanation of this modification is unnecessary.

The modification of Fig. 11 differs from the arrangement shown in Fig. 10 in that a single condenser 121 in conjunction with the cathode biasing resistances 101 and 105 provide the desired anti-hunting action and, therefore, replace the resistances 115, 117, 119 and 120 and the condensers 116 and 118 of Fig. 10. As shown, the condenser 121 is connected between the cathodes of the triodes 96 and 97. In Fig. 11, the output circuits of the triodes 96 and 97 have a common return circuit to the center tap of the transformer secondary winding 98 comprising the conductor 102 in which a resistance 122 is inserted. The resistance 122 constitutes a coupling resistance for coupling the output circuits of the triodes 96 and 97 to the parallel connected input circuits of the motor drive tubes 72 and 73. This coupling circuit includes a condenser 123 which is connected between a contact 124 in engagement with resistance 122 and the control electrodes of tubes 72 and 73. If desired, additional stages of amplification may be provided between the coupling resistance 122 and the input circuit of triodes 72 and 73. The control electrodes 72 and 73 are connected by means of a fixed resistance 125 to the grounded conductor 65. The contact 124 in engagement with the resistance 122 is preferably slideable along the length of the latter and is provided for varying the sensitivity of the apparatus.

In the operation of this modification of my invention an increase occurs in the bias voltage impressed on the control electrode of the triode 96 or 97 whose conductance is increased as a result of unbalance of the bridge network 2 and a simultaneous decrease occurs in the bias on the control electrode of the other triode 96 or 97. This change in the bias voltages impressed on the control electrodes of the triodes 96 and 97 operates to change the amplification provided by these triodes so that when the alternating voltage impressed on the control electrodes of triodes 96 and 97 decreases as the bridge network 2 is being rebalanced, the conductivities of the two triodes will be rendered exactly equal or their conductive relations will be reversed before the rebalancing action of the bridge network 2 is completed, thus providing compensation for the inertia of the motor and the associated rebalancing structure. In other words, as the rebalancing action reduces the alternating voltage impressed on the control electrodes of triodes 96 and 97, delayed recovery in the biasing voltages applied to the said control electrodes due to the action of condenser 121 causes premature restoration of the triode conductances to equality or even reversal in the conductive relations, thus effecting a positive and powerful damping action on the operation of the motor 14.

The modification of Fig. 12 differs from the arrangement of Fig. 6 in that two series connected resistances 126 and 127 are connected in the cathode circuit of triode 96 in lieu of the resistance 101 and two series connected resistances 128 and 129 are connected in the cathode circuit of triode 97 in lieu of the resistance 105. A center tapped resistance 130 is connected between the point of connection of resistances 126 and 127 and the point of connection of resistances 128 and 129. The center tap on resistance 130 is connected to the grounded conductor 65. A resistance 131 is connected between the control electrode of the motor drive tube 72 and a conductor 132 which is connected to the lower terminals of resistances 108, 127 and 129 and also is connected to the center tap on the transformer secondary winding 98. Similarly, a resistance 133 is connected between the control electrode of the motor drive tube 73 and the conductor 132.

Compensation for the inertia of the reversible electrical motor 14 and the associated bridge rebalancing mechanism is obtained in Fig. 12 by means of the delaying action of a parallel connected resistance 134 and a condenser 135 which are connected between the cathode of triode 96 and the control electrode of tube 72 in conjunction with resistance 131, and by means of a parallel connected resistance 136 and a condenser 137 which are connected between the cathode of triode 97 and the control electrode of tube 73 in conjunction with resistance 133.

The manner in which the desirable damping of motor 14 is accomplished by the modification of Fig. 12 will now be explained. On the assumption that the direction of the bridge network unbalance is such as to cause the application of an alternating voltage to the control electrodes of triodes 96 and 97 of the proper phase to cause an increase in the conductance of triode 96 and a decrease in the conductance of the triode 97, an increase in potential drop will be produced across the resistances 126 and 127 while a decrease in potential drop will be produced across the resistances 128 and 129. The increase in potential drop across resistances 126 and 127 will be immediately transmitted by the parallel connected resistance 134 and condenser 135 to the control electrode of the tube 72 to cause an increase in the conductivity of the latter. Simultaneously, the decrease in potential drop across the resistances 128 and 129 will be transmitted by the parallel connected resistance 136 and condenser 137 to the control electrode of tube 73 to cause a decrease in the conductance of the latter. In this manner, the motor 14 will be selectively energized for rotation in the proper direction to effect rebalance of the bridge network.

As the rebalancing action proceeds, a current flow will be established from the upper end of resistance 126 through the resistance 134 and resistance 131 and through the conductor 132 to the lower end of resistance 127. This current flow will establish a potential drop across the resistance 134 which will have the effect of causing the potential of the control electrode of tube 72 to be driven less positive. Simultaneously, there will be a decrease in the current flow through the resistance 138, and accordingly, the potential of the control electrode of tube 73 will be rendered less negative. As the alternating voltage impressed on the control electrodes of triodes 96 and 97 from the output circuit of the pre-amplifier decreases in value, the delayed recovery in the bias voltages on the control electrodes of tubes 72 and 73 caused by the condensers 135 and 137 will effect premature restoration of the conductances of tubes 72 and 73 to equality or even reversal in the conductive relation, and consequently, the motor 14 will be deenergized and may even be energized for rotation in the reverse direction before the bridge network 2 is rebalanced. In this manner, precise compensation for the inertia of the rebalancing motor and the associated bridge rebalancing structure may be obtained thus eliminating or at least minimizing the tendency for the motor drive system to overshoot the balance point and to hunt.

In the modifications of my invention shown in Figs. 1 and 3 through 12, the controlling voltage for selectively actuating the reversible electrical motor 14 for rotation in one direction or the other is alternating in character and is of the same frequency as that supplied by the mains 4 and 5. In Fig. 13, I have illustrated another type of self-balancing electrical network in which my invention may advantageously be incorporated and in which the controlling voltage for effecting selective energization of the reversible motor 14 for rotation in one direction or the other is a unidirectional voltage. Specifically, the controlling voltage is that produced across a resistance 138 and is variable in magnitude in accordance with the changes in a variable condition to be measured. The manner in which a variable unidirectional voltage is produced across resistance 138 is immaterial for the purposes of the present invention. Merely by way of example, however, it may be produced by a direct current flow through resistance 138 from conductors 139 and 140 which may be connected in the output circuit of a photoelectric pyrometer of the type disclosed in Fig 1 of the J. T. Nichols Patent 2,241,557, which was issued on May 13, 1941, from an application filed July 25, 1936.

The variable unidirectional voltage drop produced across the resistance 138 is impressed on the input circuit of a triode 141 having anode, control electrode, cathode and heater filament elements. Triode 141 comprises one triode of a twin tube which contains a second triode 142 which may be identical to the triode 141. The input circuit for the triode 141 may be traced from the control electrode through resistance 138, a slidewire resistance 143, a contact 144 which is in slideable engagement with resistance 143, and a cathode biasing resistance 145 to the cathode of triode 141. The input circuit of triode 142 may be traced from the control electrode through the cathode biasing resistance 145 to the cathode of triode 142.

Energizing voltage is supplied the heater filaments of triodes 141 and 142 from the secondary winding 146 of a transformer 43c having a line voltage primary winding 44 and secondary windings 46 and 147 in addition to the secondary winding 146.

A unidirectional current flow is established through the slidewire resistance 143 by a full wave rectifier and filter arrangement generally designated by the reference character 148 which receives energizing current through supply conductors 149 and 150 from the supply conductors 4 and 5. To this end, the end terminals of resistance 143 are connected to the output terminals 151 and 152 of the filter 148. The polarity of the terminal 151 is positive with respect to that of terminal 152, and hence, the potential of the upper terminal of resistance 143 is rendered positive with respect to the lower terminal when the variable potential drop under measurement produced across resistance 138 is of the polarity indicated. The sliding contact 144 in engagement with resistance 143 is arranged to be adjusted along the length of resistance 143 by the reversible electrical motor 14. Preferably, the slidewire resistance 143 and contact 144 are arranged in cooperative relation with a recorder chart and recording mechanism as is shown in Fig. 2 to provide a record of the variations in voltage across resistance 138.

Anode voltage is supplied to triodes 141 and 142 from the full wave rectifier and filter 148. Specifically, the anode circuit of triode 141 may be traced from the positive terminal 153 of the rectifier and filter 148 through a conductor 154, a resistance 155, a parallel connected resistance 156 and condenser 157 to the anode of triode 141, the cathode, the cathode biasing resistance 145 and a conductor 158 to the negative terminal 159 of the rectifier and filter 148. The anode circuit of triode 142 may be traced from the positive terminal 153 through conductor 154, a resistance 160, a parallel connected resistance 161 and condenser 162 to the anode of triode 142, the cathode, the cathode biasing resistance 145 and the conductor 158 to the negative terminal 159.

The potential drop produced across resistance 155 by the anode current flow through the triode 141 is impressed on the input circuit of triode 72 and the potential drop produced across the resistance 160 by the anode current flow of triode 142 is impressed on the input circuit of triode 73. Specifically, the cathodes of triodes 72 and 73 are connected to the upper ends of resistances 155 and 160, the control electrode of triode 72 is connected to the lower end of resistance 155, and the control electrode of triode 73 is connected to the lower end of resistance 160. The triodes 72 and 73 correspond to the triodes 72 and 73 of the previously described modifications of my invention and receive anode energizing voltage from the transformer secondary winding 46 and are arranged to effect selective actuation of the motor control winding 39 with pulsating current which leads or lags by approximately 90° the voltage of the alternating supply mains 4 and 5 when one or the other of the triodes 72 and 73 is rendered more conductive than the other.

In the balanced condition of the arrangement of Fig. 13, the sliding contact 144 will assume such a position along the length of resistance 143 that the potential drop across resistance 143 tapped off by the contact 144 is exactly equal and opposite to the potential drop produced across the resistance 138. With such adjustment, the control electrode of triode 141 will be at the potential of the lower or negative end of cathode biasing resistance 145, as will also the control electrode of triode 142. The anode current flow through the resistance 155 will then be exactly the same as that through the resistance 160, and consequently, the control electrode of triode 72 will be at the same potential as that of triode 73. Under this condition, the conductivity of triode 72 is exactly the same as that of triode 73, and hence, motor 14 will not be energized for rotation in either direction.

Upon change in the voltage drop produced across resistance 138, for example, upon an increase in that potential drop, the triode 141 will be rendered more conductive than the triode 142. Consequently, the potential drop across resistance 155 will increase to cause the control electrode of triode 72 to become negative with respect to the potential of the associated cathode. This will cause the conductivity of triode 72 to decrease relatively to the conductivity of triode 73, and therefore, effectuate energization of motor 14 for rotation. The direction of rotation of motor 14 will be such as to cause movement of the sliding contact 144 in the upward direction to counteract the increased potential produced across resistance 138.

Upon sustained unbalance in the opposed potential drops across resistances 138 and 143, the condenser 157 in the anode circuit of triode 141 will gradually charge to cause an increase in the voltage drop across the resistance 156. This increased potential drop across resistance 156 effectively decreases the anode voltage applied to triode 141, and therefore, causes a reduction in the amplification which is provided by the triode 141. Thus, upon unbalance, the amplification provided by triode 141 for the case considered is rendered less than that of triode 142. As the potential of the control electrode of triode 141 relatively to the potential of the associated cathode is gradually restored to its original value due to adjustment of contact 144 along slidewire resistance 143, delayed recovery in the potential drop across resistance 156 to its original value causes the amplification of triode 141 to temporarily remain at such decreased value with the result that the potential drop across resistance 155 will be restored to equality with the voltage drop across resistance 160 before the adjustment of the contact 144 to the new balanced position has been completed. Restoration of the potential drops across resistances 155 and 160 causes deenergization of motor 14 for rotation. Thus, the motor 14 is prematurely deenergized for rotation as a result of the action of the parallel connected resistance 156 and condenser 157. By proper choice of the circuit components, the potential drop across resistance 155 may even become less than that across resistance 160 before the adjustment of contact 144 is completed to thereby effectuate energization of reversible motor 14 for rotation in the reverse direction.

The aforementioned damping action is further enhanced by the operation of the resistance 161 and condenser 162 in the anode circuit of triode 142. When the conductivity of triode 141 is increased, the bias voltage produced across resistance 145 is increased to cause the potential of the control electrode of triode 142 to be rendered more negative with respect to the potential of the associated cathode. Consequently, upon increase in the conductivity of triode 141 the conductivity of triode 142 will be decreased. Decrease in the conductivity of triode 142 will cause a decrease in the current flow through resistances 160 and 161 and, therefore, will cause an increase in the conductivity of the triode 73. Such increase in conductivity of triode 73 is in the proper direction to produce a greater energizing current flow to motor 14 for rotation in the direction of rotation. The decrease in potential drop across resistance 161 causes a greater anode voltage to be applied to the anode of the triode 142 and therefore provides greater amplification from the triode 142. While the potential of the control electrode 141 is being restored to its original value relatively to that of its associated cathode, the condenser 162 delays recovery of the potential drop across resistance 161 to its original value, and therefore, tends to maintain the amplification of the triode 142 at an increased value at the same time that the condenser 157 tends to maintain the amplification of triode 141 at a decreased value. These two effects combine to effect premature deenergization of motor 14 for rotation and if desired actual energization of the motor for rotation in the reversed direction to quickly bring the motor to a stop and prevent overshooting and consequent hunting.

Subject matter disclosed but not claimed herein is disclosed and claimed in a divisional application filed May 1, 1947, Serial No. 745,308, which issued as Patent No. 2,449,476 on September 14, 1948.

While in accordance with the provisions of the statutes, I have illustrated and described the best forms of my invention now known to me, it will be apparent to those skilled in the art that changes in the form of the embodiments of my invention illustrated and described herein may be made without departing from the spirit of the invention as set forth in the appended claims. It will be understood also that use may sometimes be advantageously made of some features of my invention without a corresponding use of other features.

Having now described my invention, what I claim as new and desire to secure by Letters Patent is as follows:

1. An electrical network including a pair of electronic valves each having an input circuit and having normally equally conductive output circuits connected in opposite phase relation to an alternating current supply source, means to impress a variable controlling voltage on at least one of said input circuits to vary the conductivity of the corresponding one of said valves with respect to the conductivity of the other of said valves, means to adjust the voltages impressed on said input circuits as required to restore equality in the conductivities of said valves, electrical reactance means connected in both the input and output circuits of said valves and operative prior to completion of the adjustment by said last mentioned means to restore equality in the conductivities of said valves, and a motor having a winding coupled to said output circuits.

2. A motor control apparatus for use with an alternating current supply source providing alternating current of predetermined frequency, including a pair of electronic valves having normally equally conductive output circuits connected in opposite phase relation to said alternating current supply source and having input circuits to which a variable controlling voltage is coupled in substantially unmodified form to increase the conductivity of one of said valves above that of the other of said valves, electrical reactance means connected in both the input and output circuits of said valves and operative upon decrease in said controlling voltage to reverse the conductive relations of said valves before said controlling voltage is reduced to zero, and an alternating current motor having a winding coupled to said output circuits and a winding adapted to be coupled to said alternating current source.

3. A motor control apparatus for use with an alternating current supply source providing alternating current of predetermined frequency, including a pair of electronic valves having normally equally conductive output circuits connected in opposite phase relation to said alternating current supply source and having input circuits to which a variable controlling voltage is adapted to be coupled to increase the conductivity of one of said valves above that of the other of said valves, means to couple said controlling voltage in substantially unmodified form to said input circuits, said coupling means including electrical reactance means operative upon decrease in said controlling voltage to first restore equality in the conductivities of said valves and then to increase the conductivity of said other valve above that of said one valve before said controlling voltage is reduced to zero, and an alternating current motor having a winding coupled to said output circuits and a winding adapted to be coupled to said alternating current source.

4. A motor control apparatus for use with an alternating current supply source providing alternating current of predetermined frequency, including a pair of electronic valves having normally equally conductive output circuits connected in opposite phase relation to said alternating current supply source and having input circuits to which is coupled a variable controlling voltage having an alternating component of said predetermined frequency which is substantially in phase with or substantially 180° out of phase with the alternating current of said source to increase the conductivity of one of said valves above that of the other of said valves, electrical reactance means connected in both the input and output circuits of said valves and operative upon decrease in said controlling voltage to reverse the conductive relations of said valves before said controlling voltage is reduced to zero, and an alternating current motor having a winding coupled to said output circuits and a winding adapted to be coupled to said alternating current source.

5. A motor control apparatus including an alternating current supply source providing alternating current of predetermined frequency, a pair of electronic valves having output circuits connected in opposite phase relation to said alternating current supply source and having input circuits upon which a controlling voltage having an alternating component of said predetermined frequency is adapted to be impressed to increase the conductivity of one of said valves and to decrease the conductivity of the other of said valves, time delay means connected in said input and output circuits and operative when one of said valves becomes more conductive than the other to decrease the amplification provided by the electronic valve the conductivity of which is increased, and an alternating current motor having a winding coupled to said output circuit and a winding coupled to said alternating current source.

6. A motor control apparatus including an alternating current supply source providing alternating current of predetermined frequency, a pair of electronic valves having output circuits connected in opposite phase relation to said alternating current supply source and having input circuits upon which a controlling voltage having an alternating component of said predetermined frequency which is substantially in phase with or 180° out of phase with said alternating current is adapted to be impressed to increase the conductivity of one of said valves and to decrease the conductivity of the other of said valves, resistance means connected in said input and output circuits and operative when one of said valves becomes more conductive than the other to decrease the amplification provided by the electronic valve the conductivity of which is increased, capacitance means associated with said resistance means to delay the effects of the latter on the amplification provided by said last mentioned electronic valve, and an alternating current motor having a winding coupled to said output circuits and a winding coupled to said alternating current source.

7. A motor control apparatus including an alternating current supply source providing alternating current of predetermined frequency, a pair of electronic valves having output circuits connected in opposite phase relation to said alternating current supply source and having input circuits upon which a controlling voltage having an alternating component of said predetermined frequency which is substantially in phase with or 180° out of phase with said alternating current is adapted to be impressed to increase the conductivity of one of said valves and to decrease the conductivity of the other of said valves, a parallel connected resistance and capacitance connected in each of said output circuits to decrease the amplification provided by the electronic valve the conductivity of which is increased, and an alternating current motor having a winding coupled to said output circuits and a winding coupled to said alternating current source.

8. A motor control apparatus including an alternating current supply source providing alternating current of predetermined frequency, a pair of electronic valves having output circuits connected in opposite phase relation to said alternating current supply source and having input circuits upon which a controlling voltage having an alternating component of said predetermined frequency which is substantially in phase with or 180° out of phase with said alternating component is adapted to be impressed to increase the conductivity of the other of said valves, means in said input circuits to produce biasing voltages which are oppositvely variable from a normal value in one direction or the other and to an extent depending upon the phase and amplitude respectively of said alternating component of voltage, means to delay changes in said biasing voltages, and an alternating current motor having a winding coupled to said output circuits and a winding coupled to said alternating current source.

9. Means to control the operation of a reversible electrical motor for rotation in one direction or the other in accordance with the phase and amplitude of a controlling alternating voltage of predetermined frequency including an alternating current supply source providing alternating current of said predetermined frequency, a pair of electronic valves having output circuits connected in opposite phase relation to said alternating current supply source and having input circuits upon which said controlling alternating voltage is impressed to increase the conductivity of one of said valves and to decrease the conductivity of the other of said valves, time delay means connected in said input and output circuits and operative when one of said valves becomes more conductive than the other to decrease the amplification provided by the electronic valve the conductivity of which is increased, and an alternating current motor to be controlled having a winding coupled to said output circuits and a winding coupled to said alternating current source.

10. Means to control the operation of a reversible electrical motor for rotation in one direction or the other in accordance with the phase and amplitude of a controlling alternating voltage of predetermined frequency including an alternating current supply source providing alternating current of said frequency, said controlling alternating voltage being substantially in phase with or 180° out of phase with the alternating current of said source, a pair of electronic valves having output circuits connected in opposite phase relation to said alternating current supply source and having input circuits upon which said controlling alternating voltage is impressed to increase the conductivity of one of said valves and to decrease the conductivity of the other of said valves, resistance means connected in said input and output circuits and operative when one of said valves becomes more conductive than the other to decrease the amplification provided by the electronic valve the conductivity of which is increased, capacitance means associated with said resistance means to delay the effects of the latter on the amplification provided by the last mentioned electronic valve, and an alternating current motor to be controlled having a winding coupled to said output circuits and a winding coupled to said alternating current source.

11. Means to control the operation of a reversible electrical motor for rotation in one direction or the other in accordance with the phase and amplitude of a controlling alternating voltage of predetermined frequency including adjustable means to create and to regulate the amplitude of said controlling alternating voltage, an alternating supply source providing alternating current of said predetermined frequency, said controlling alternating voltage being substantially in phase with or 180° out of phase with the alternating current of said source, a pair of electronic valves having output circuits connected in opposite phase relation to said alternating current source and having input circuits upon which said controlling alternating voltage is impressed to increase the conductivity of one of said valves and to decrease the conductivity of the other of said valves, resistance means connected in each of said output circuits to decrease the amplification provided by the electronic valve the conductivity of which is increased, capacitance means associated with said resistance means to delay the effects of the said resistance means on the amplification provided by the last mentioned electronic valve, and an alternating current motor having a winding coupled to said output circuits and a winding coupled to said alternating current source to adjust said adjustable means to reduce the amplitude of said controlling alternating voltage.

12. Means to control the operation of a reversible electrical motor for rotation in one direction or the other in accordance with the phase and amplitude of a controlling alternating voltage of predetermined frequency including adjustable means to create and to regulate the amplitude of said controlling alternating voltage, an alternating current supply source providing alternating current of said predetermined frequency, said controlling alternating voltage being substantially in phase with or 180° out of phase with the alternating current of said source, a pair of electronic valves having output circuits connected in opposite phase relation to said alternating current source and having input circuits upon which said controlling alternating voltage is impressed, a parallel connected resistance and capacitance connected in each of said output circuits to decrease the amplification provided by the electronic valve the conductivity of which is increased as a result of application of said controlling alternating voltage to said input circuits, and an alternating current motor having a winding coupled to said output circuits and a winding coupled to said alternating current source to adjust said adjustable means to reduce the amplitude of said controlling alternating voltage.

13. Means to control the operation of a reversible electrical motor for rotation in one direction or the other in accordance with the phase and amplitude of a controlling alternating voltage of predetermined frequency including adjustable means to create and to regulate the amplitude of said controlling alternating voltage, an alternating current supply source providing alternating current of said predetermined frequency, said controlling alternating voltage being substantially in phase with or 180° out of phase with the alternating current of said source, a pair of electronic valves having output circuits connected in opposite phase relation to said alternating current source and having input circuits upon which said controlling alternating voltage is impressed, means in said input circuits to produce biasing voltages which are oppositely variable from a normal value in one direction or the other and to an extent depending upon the phase and amplitude respectively of said controlling alternating voltage, means to delay changes in said biasing voltages, and an alternating current motor having a winding coupled to said output circuits and a winding coupled to said alternating current source to adjust said adjustable means to reduce the amplitude of said controlling alternating voltage.

14. Means to control the operation of a reversible electrical motor for rotation in one direction or the other in accordance with the phase and amplitude of a controlling alternating voltage of predetermined frequency including adjustable means to create and to regulate the amplitude of said controlling alternating voltage, terminals to which an alternating current supply source providing alternating current of said predetermined frequency is adapted to be connected, said controlling alternating voltage being substantially in phase with or 180° out of phase with the alternating current of said source, a transformer having a primary winding connected to said source of alternating current and having a center tapped secondary winding, a pair of electronic valves each having an anode, a cathode and a control electrode, means to impress said controlling alternating voltage between said cathodes and control electrodes, a connection from one end of said transformer secondary winding to the anode of one of said valves, a connection from the other end of said secondary winding to the anode of the other of said valves, an alternating current motor to adjust said adjustable means to reduce the amplitude of said controlling alternating voltage and having two windings one of which is connected to said terminals, a parallel connected resistance and capacitance connected between each of the cathodes of said valves and one end of the other of said motor winding, and a connection from the other end of said other motor winding to the center tap on said transformer secondary winding.

15. Means to control the operation of a reversible electrical motor for rotation in one direction or the other in accordance with the phase and amplitude of a controlling alternating voltage of predetermined frequency including adjustable means to create and to regulate the amplitude of said controlling alternating voltage, terminals to which an alternating current supply source providing alternating current of said predetermined frequency is adapted to be connected, said controlling alternating voltage being substantially in phase with or 180° out of phase with the alternating current of said source, a transformer having a primary winding connected to said terminals and thereby adapted to be connected to said source of alternating current and having a center tapped secondary winding, a pair of electronic valves each having an anode, a cathode and a control electrode, means to impress said controlling alternating voltage between said control electrodes and cathodes, a parallel connected resistance and capacitance connected between one end of said secondary winding and the anode of one of said valves, a parallel connected resistance and capacitance connected between the other end of said secondary winding and the anode of the other of said valves, an output resistance connected between each of the cathodes of said valve and the center tap on said secondary winding, an alternating current motor to adjust said adjustable means having two windings one of which is connected to said terminals, and means differentially coupling the other of said motor windings to said output resistances.

16. Means to control the operation of a reversible electrical motor for rotation in one direction or the other in accordance with the phase and amplitude of a controlling alternating voltage of predetermined frequency including adjustable means to create and to regulate the amplitude of said controlling alternating voltage, terminals to which an alternating current supply source providing alternating current of said predetermined frequency is adapted to be connected, said controlling alternating voltage being substantially in phase with or 180° out of phase with the alternating current of said source, a transformer having a primary winding connected to said terminals and having a center tapped secondary winding, a pair of electronic valves having an anode, a cathode and a control electrode, means to impress said controlling alternating voltage between said control electrodes and cathodes, a connection between one end of said secondary winding and the anode of one of said valves, a connection between the other end of said secondary winding and the anode of the other of said valves, an output resistance connected between each of the cathodes of said valves and the center tap on said secondary winding, a condenser connected between said cathodes, an alternating current motor to adjust said adjustable means having two windings one of which is connected to said terminals, and means differentially coupling the other of said motor windings to said output resistances.

17. An electrical network including a pair of electronic valves each having an input circuit and having normally equally conductive output circuits connected in opposite phase relation to an alternating current supply source, means to impress a variable controlling voltage on at least one of said input circuits to vary the conductivity of the corresponding one of said valves with respect to the conductivity of the other of said valves, means responsive to the relative conductivities of said valves to adjust the voltage impressed on said input circuits as required to restore equality in the conductivities of said valves, and electrical reactance means connected in both the input and output circuits of said valves and operative prior to completion of the adjustment by said last mentioned means to restore equality in the conductivities of said valves.

THOMAS R. HARRISON.

REFERENCES CITED

The following references are of record in the file of this patent:

UNITED STATES PATENTS

| Number | Name | Date |
| --- | --- | --- |
| 1,998,938 | Mittag | Apr. 23, 1935 |
| 2,040,014 | Moseley | May 5, 1936 |
| 2,064,454 | Wittkuhns et al. | Dec. 15, 1936 |
| 2,085,128 | Staege | June 29, 1937 |
| 2,147,674 | Satterlee | Feb. 21, 1939 |
| 2,154,375 | Chambers | Apr. 11, 1939 |
| 2,192,022 | Wills | Feb. 27, 1940 |
| 2,209,369 | Wills | July 30, 1940 |
| 2,263,497 | Harrison | Nov. 18, 1941 |
| 2,300,742 | Harrison et al. | Nov. 3, 1942 |
| 2,364,483 | Side | Dec. 5, 1944 |
| 2,426,711 | Shaffer | Sept. 2, 1947 |